2,332,625

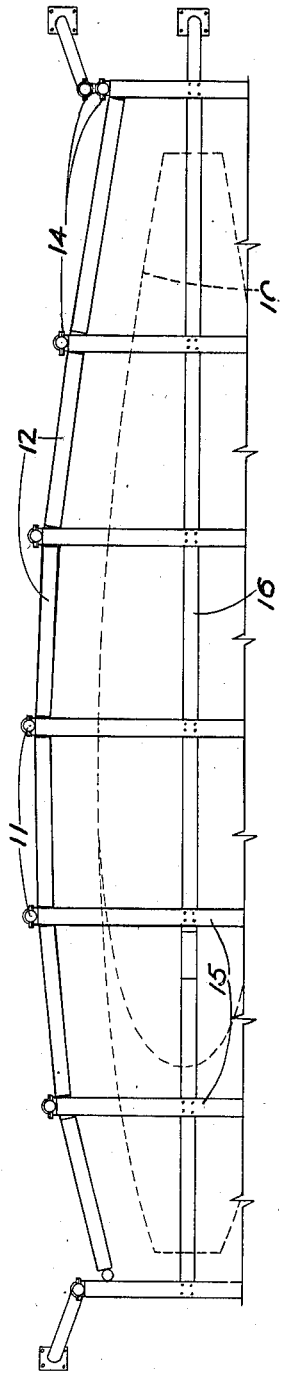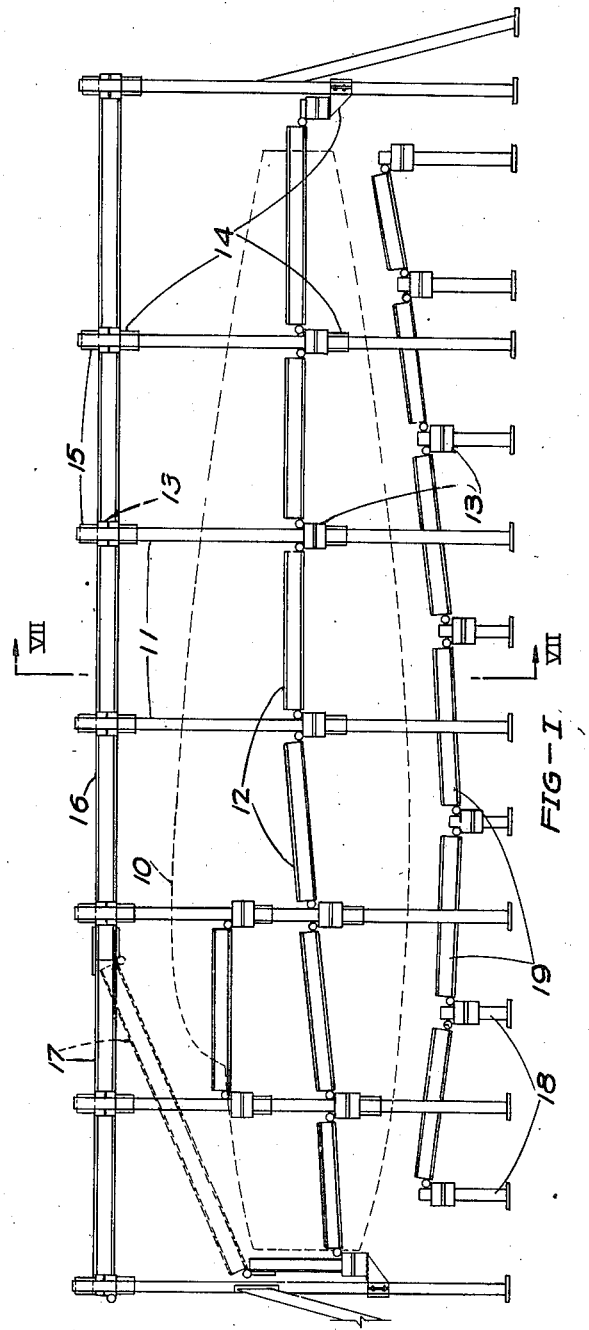

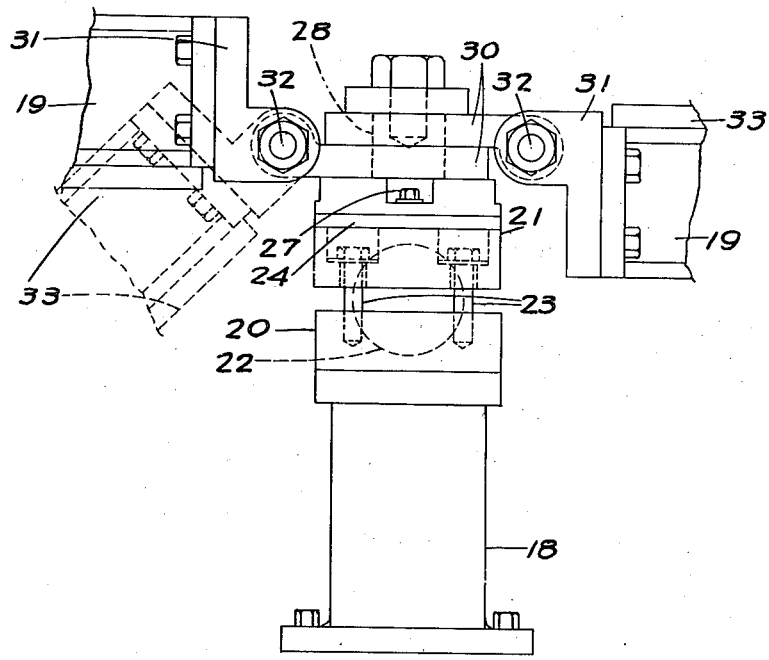
FIG-III
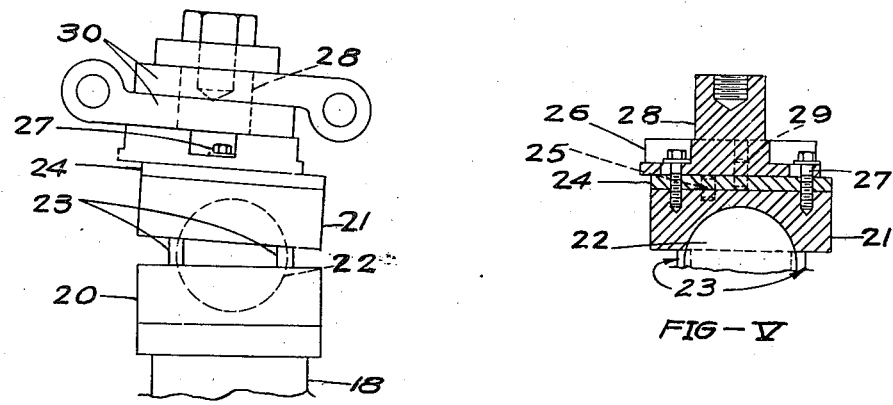
FIG-IV
FIG-V

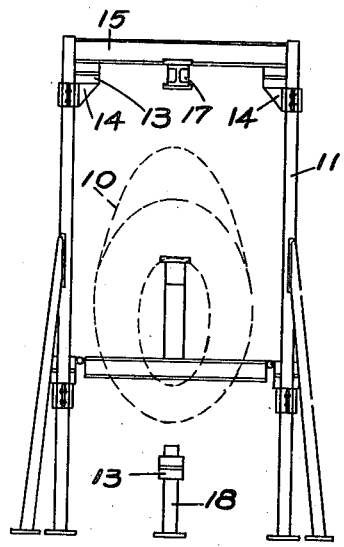
FIG-VI
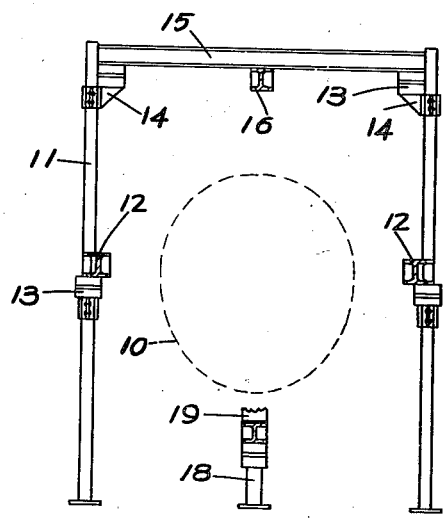
FIG-VII
INVENTORS
GEORGE ARTHUR BETTS
WILLIAM HAROLD ELLIS
AGENT Patented Oct. 26, 1943

UNITED STATES PATENT OFFICE 2,332,625

ASSEMBLY JIG

William Harold Ellis, El Cerrito, and George Arthur Betts, Santa Monica, Calif., assignors to Lockheed Aircraft Corporation, Burbank, Calif.

Application August 28, 1940, Serial No. 354,566

7 Claims. (Cl. 144—288.2)

This invention relates to an improved assembly jig for aligning the component parts of quantity production units, such as airplanes or boats, during the construction thereof.

Where a number of units of one design are to be built it facilitates construction and interchangeability of components if the unit is assembled from pre-fabricated parts or sub-assemblies in a form or jig having locating means for the various components. It has heretofore been the practice to build up such a jig or framework by welding the parts thereof, thus providing a permanent arrangement that can not be disassembled for moving or storage and forms a one purpose unit that cannot readily be altered except by cutting out and scrapping the parts to be replaced.

It is accordingly an object of this invention to provide a demountable and adjustable fabricating jig or assembling fixture of the type described wherein precise location and leveling can be attained, and reproduced should the fixture be disassembled for moving or storage. Such an arrangement provides machined contact surfaces for members which permits dismantling and reassembling, and the component parts can be made interchangeable and stocked as standard parts, so that when a jig or fixture becomes obsolete it can be dismantled and the various parts returned to stock.

It is a further object of this invention to provide an improved and simplified jig or fixture of the class described, which embodies adjustable ball joints and offsetable supporting heads for leveling and locating various components of the fixture or jig, providing precise leveling and locating of beams, supports and other members which in turn locate units of the body being fabricated.

It is also an object of this invention to provide an improved and simplified jig or fixture of the class described wherein various beams are supported on adjustable ball joints by means of hinge joints at the ends of the beams so that precise leveling or angles can be set up by using the hinge points of the beams after the manner of tool makers sine bars. The hinged supports for the beams also allow ready removal and replacement by removing or inserting hinge pins.

It is another object of this invention to provide an improved jig or fixture of the type described wherein mounting points for the various elements of the jig or fixture are universally adjustable and demountable by means of a combined ball joint and offset mounting member which when finally adjusted can be doweled to an intermediate member to retain the precise adjustment desired, the mounting member being usable over and over again while the intermediate member can be replaced inexpensively when too many dowel holes have been drilled therein.

Other and further important objects of this invention will be apparent from the disclosures in the specification and the accompanying drawings.

This invention in its preferred form is illustrated in the drawings and hereinafter more fully described.

In the drawings:

Figure I is a side elevation of an airplane fuselage assembly jig or fixture embodying the features of this invention, a fuselage being outlined in dotted lines therein.

Figure II is a fragmentary plan view of the jig of Figure I.

Figure III is an enlarged detail side elevation of one of the adjustable ball joint leveling and locating members showing various means of supporting structural or aligning beams thereon.

Figure IV is an enlarged detail corresponding to Figure III but showing exaggerated tilting and offset adjustments thereof.

Figure V is a central section of the top of the adjustable ball joint member, in the central plane parallel to that of Figure IV, showing how the joint member is doweled to the intermediate member to retain the desired precise adjustments thereof.

Figure VI is an end elevation of the completed jig corresponding to the left side of Figure I.

Figure VII is a transverse section taken on the line VII—VII of Figure I.

As shown:

The embodiment chosen to illustrate this invention relates to an airplane fuselage assembly jig or fixture, and the outlines of an airplane fuselage 10 have been indicated by dotted lines in Figures I and II. This particular type of fixture is designed to support locators for a series of bulkheads (not shown) and moulds forming the shape of the fuselage, these bulkheads being pre-fabricated and supported in precise location on the several beams forming parts of the fixture, much in the way a boat is built on a series of moulds; the fuselage bulkheads and rings supporting a series of spaced longitudinal stringers to which the skin or covering is applied.

In designing a particular fixture, the outline of the object to be assembled determines the general shape of the fixture, various members thereof being so located as to position or support critical parts or section forms thereof. In the case of the illustrated fuselage, a series of vertical posts 11 are so positioned at intervals as to support horizontal beams 12 of convenient lengths to outline the plan profile of the fuselage, providing space for mounting locators (not shown) thereon, which align the various fuselage bulkheads, formers and rings and are removable when the outer skin is to be applied at the holding points of the locators. The series of beams 12 are supported by adjustable ball joints 13, to be described in more detail hereinafter, the ball joints 13 being supported by angle brackets 14 clamped to the posts 11 and doweled in their final position thereon after the beams have been adjusted for heighth.

A series of cross-beams 15 are supported by other ball joints 13 and angle brackets 14, near the tops of the posts 11, to support a central horizontal beam 16, which provides a trolley track for removing the completed fuselage from the jig or fixture, as well as providing mounting or suspension points for various bulkhead locators. As shown in Figure I, a front section 17 of the beam 16 may be hinged to the remaining portion of the beam to be swung down into the dotted position during construction of the fuselage, and swung back to its horizontal position to clear the fuselage and serve as part of the trolley track.

An axially disposed line of short posts 18 carry ball joints 13 supporting a line of beams 19 which correspond to keel supports in ship building, these beams being conveniently set up at angles approximating the bottom outline of the fuselage, but sufficiently spaced therefrom to provide working access to all portions of the fuselage skin; as before, temporary or removable locators supporting the various bulkheads and rings in position.

An important feature of this invention is the adjustable leveling and locating ball joint unit hereinbefore referred to by the numeral 13. This unit is shown in more detail in Figures III, IV and V and in connection with the beam mounting means therefor provides an extremely flexible set up that permits the precision adjustment of location points and accurate angle settings that can be subsequently reproduced should the jig be knocked down for reassembly elsewhere. The ball joints 13 are formed by a pair of spaced opposed members 20 and 21 having central spherical recesses in their facing surfaces to receive a large ball 22, the members being clamped about the ball by four cap screws 23 of which opposing pairs may be oppositely adjusted to tilt the upper member 21 relative to the lower member. The lower member of the ball joint may be mounted on angle brackets 14 clamped to the posts as previously mentioned, or may be mounted on top a post as in Figure III. The upper member 21 carries a dowel pad 24 having one or more dowels 25 locating it concentric with the member 21, the dowel locations being standardized and duplicated more than once in the dowel pad so that after once being used the dowel pad can be turned to a new position and redoweled to the member 21, without redrilling dowel holes.

A pin member 26 in turn is secured to the upper member 21 by cap screws 27 passing through the dowel pads 24, the cap screws passing through enlarged holes in the member 26 to permit offset adjustment thereof. The member 26 carries a central pin 28 and the lateral adjustment of the member 26 permits accurate location of the pin 28 relative to the jig or fixture as a whole. The member 26 is predrilled for dowels 29 so that the hole therein serves as a drill guide for drilling the dowel holes in the dowel pad after the pin 28 has been finally adjusted.

The several beams 19 are end supported and centered on the members 26 and pins 28 by means of hinge members 30 and 31 joined together by removable hinge pins 32, the hinge axis in the members 30 being sufficiently offset to align with one surface thereof so that by mounting one hinge member 30 on the pin 28 with its axis upwardly offset, and another on top thereof with its axis downwardly offset, the opposite hinge axes will be in horizontal alignment. The hinge members 31 attached to the beam ends may be mounted up or down, as indicated on either side of Figure II, when both are put on in the same direction the working surfaces of the beams are aligned unless purposely mounted at an angle.

Since the beams 12 and 19 support locators for various units of the fuselage it is desirable to thicken the working flange thereof, as by applying an additional layer 33 of metal thereto to provide a sufficient thickness to permit machining the surface thereof in alignment with the hinge pins, and to provide a sufficient depth of tapped holes for the locators. Beams so prepared can have the hinge members 31 mounted thereon to support the beam with its working face 33 facing up, down, or sideways, as conditions require.

While the beams may conveniently be made of various lengths in accordance with requirements at different locations in the fixture; by providing a working surface in known relationship with the hinge pin axes at either end, and a known distance between pin axes, the beam as a whole can be accurately set up at any desired angle by utilizing the principles of a tool-makers sine bar, namely by multiplying the sine of the desired angle by the length between the pin axes, and utilizing the result to determine the elevation of one pin relative to the other. In this way the keel beams may be set to approximate the contour of the bottom of the fuselage but spaced therefrom so that a series of stock locating members can be used to support bulkheads and other structural parts of the fuselage at their proper locations along the series of beams.

An assembly jig or fixture constructed in accordance with the principles of this invention can be rapidly, accurately, and rigidly constructed from standard or stock material, and after having been assembled can be torn down and the parts thereof returned to stock or reassembled in another place, plant, or country, with the assurance that the original accuracy of assembly will be attainable. Further, any member may be removed or swung out of the way for a particular operation, being returned to position thereafter.

While the illustrated embodiment of this invention relates to a fuselage jig or fixture, it will be evident that the invention broadly contemplates the provision of assembly jigs or fixtures for other parts such as the wings or empennages of airplanes or quantity production assemblage in other and analogous fields.

Having thus described our invention and the present preferred embodiments thereof, we desire to emphasize the fact that many modifications may be resorted to provided they come within the scope of the claims.

We claim:

1. An assembly fixture of the class described comprising a series of members arranged about the outline of the object to be assembled, beams disposed between said members, and ball joints supported by said members and in turn pivotally supporting adjacent ends of a pair of said beams, and means for pivotally attaching said beams to said ball joints whereby the beams are adapted to be angularly and eccentrically adjusted relative to and independently of the ball joints and members.

2. An assembly fixture of the class described comprising a series of members arranged about the outline of the object to be assembled, beams disposed between said members, and ball joints supported by said members and in turn pivotally supporting adjacent ends of a pair of said beams independently of each other, said ball joints comprising upper and lower members, a ball, and clamping means for clamping the members about said ball, the clamping means being adjustable to vary the angularity of the upper member relative to the lower member, and means for pivotally attaching said beams to said ball joints whereby the beams are adapted to be angularly adjusted relative to and independently of the ball joints and members.

3. A demountable assembly fixture of the type described comprising a series of separate beams outlining and supporting the body to be assembled, ball joint supporting members connecting adjacent ends of contiguous beams, said ball joint supporting members including dowel plates interposed between and separately doweled to relatively adjustable parts of the ball joint members to provide a replaceable dowel location drilling plate cooperating with fixed dowel locations in the members on either side thereof.

4. A demountable assembly fixture of the type described comprising a series of separate beams outlining and supporting the body to be assembled, ball joint supporting members connecting adjacent ends of contiguous beams, said ball joint supporting members having angularly and laterally adjustable vertical pins, and said beams being fitted with horizontally pivoted members fitting over the pins of the ball joints, whereby individual beams may be universally adjusted relative to each other and to the common ball joint between contiguous beams.

5. An adjustable fixture to rigidly support members of an assembly jig comprising, a base capable of rigid attachment to the assembly jig, a head adjustably supported relative to said base by an intervening ball element, said head including a dowel plate, and a pin member adapted to support members of the assembly jigs, said dowel plate being adapted to be rigidly attached to said pin and head members by means of dowel elements.

6. A demountable assembly fixture of the type described comprising a series of panels outlining and embracing the body to be assembled, beams interconnecting the several panels, and connecting means for adjacent beam ends, including a vertical pin, connecting members hingedly carried by the ends of the beams for engagement with said vertical pin, the hinge line of said connecting members lying in the plane of one surface thereof whereby adjacent beams can be mounted on a common pin with the hinge lines of their connections in a common plane by inverting one of said connections.

7. A demountable assembly fixture of the type described comprising a series of panels outlining and embracing th body to be assembled, beams interconnecting the several panels, and connecting means for adjacent beam ends, including a vertical pin, connecting members hingedly carried by the ends of the beams for engagement with said vertical pin, the hinge lines of the connecting members at opposite ends of the beams being so constructed and arranged as to be usable in establishing the angles to which the beams are adjusted.

WILLIAM HAROLD ELLIS.
GEORGE ARTHUR BETTS.